United States Patent [19]

Backus et al.

[11] Patent Number: 4,821,073
[45] Date of Patent: Apr. 11, 1989

[54] METHOD AND APPARATUS FOR MEASURING CHARACTERISTICS OF PHOTOGRAPHIC NEGATIVES

[75] Inventors: Richard J. Backus; Patrick A. Cosgrove, both of Rochester, N.Y.

[73] Assignee: Eastman Kodak Company, Rochester, N.Y.

[21] Appl. No.: 122,996

[22] Filed: Nov. 19, 1987

[51] Int. Cl.$^4$ ............................................. G03B 27/72
[52] U.S. Cl. ........................................ 355/68; 355/38
[58] Field of Search ............... 355/38, 68, 14 E, 77, 355/7

[56] References Cited

U.S. PATENT DOCUMENTS

| | | | |
|---|---|---|---|
| 3,469,105 | 9/1969 | Stasey | 355/38 |
| 3,469,915 | 9/1969 | Thaddey et al. | 355/38 |
| 3,677,641 | 7/1982 | King et al. | 355/68 X |
| 3,708,576 | 1/1973 | Huboi et al. | 355/38 |
| 3,873,201 | 3/1975 | Amano | 355/77 |
| 3,888,580 | 6/1975 | Amano et al. | 355/38 |
| 4,099,862 | 7/1978 | Bickl et al. | 355/35 |
| 4,100,424 | 7/1978 | Akimoto et al. | 250/559 |
| 4,168,120 | 9/1979 | Freier et al. | 355/38 |
| 4,448,521 | 5/1984 | Shiota | 355/77 |
| 4,482,924 | 11/1984 | Brownstein | 358/302 |
| 4,485,406 | 11/1984 | Brownstein | 358/227 |
| 4,506,300 | 3/1985 | Fearnside | 358/225 |
| 4,571,049 | 2/1986 | Tsunefuji et al. | 354/410 |
| 4,603,966 | 8/1986 | Brownstein | 355/45 |
| 4,616,926 | 10/1986 | DiPietro et al. | 355/45 |
| 4,623,246 | 11/1986 | Kubota et al. | 355/38 |
| 4,641,959 | 2/1987 | Terashita | 355/77 |
| 4,650,316 | 3/1987 | Matsumoto | 355/55 |
| 4,659,213 | 4/1987 | Matsumoto | 355/38 |
| 4,666,307 | 5/1987 | Matsumoto et al. | 356/404 |
| 4,668,082 | 5/1987 | Terashita et al. | 355/77 |
| 4,692,797 | 9/1987 | Matsumoto | 358/76 |

FOREIGN PATENT DOCUMENTS 0152563 11/1984 European Pat. Off. .

Primary Examiner—L. T. Hix
Assistant Examiner—D. Rutledge
Attorney, Agent, or Firm—Jeffrey L. Brandt

[57] ABSTRACT

A method is provided for determining the exposure of a photographic negative to be printed in a cropped, enlarged format. The method is performed by defining a region of the negative to be printed, measuring selected density characteristics of the negative in only that region, and determining the exposure based on those measured density characteristics. The method is implemented in an enlarging photographic printer including means for defining the region of the negative to be printed, and means for measuring the selected density characteristics of the negative only in that region. Means are provided for using the selected density characteristics to calculate an exposure for the negative region, and for exposing the negative region onto photographic paper in accordance with the calculated exposure.

13 Claims, 3 Drawing Sheets

METHOD AND APPARATUS FOR MEASURING CHARACTERISTICS OF PHOTOGRAPHIC NEGATIVES

CROSS-REFERENCE TO RELATED APPLICATIONS

The present application is related to copending application serial no. (Title: ENLARGING PHOTOGRAPHIC PRINTER; Inventors: S. Amos. R. Backus, T. Jessop) assigned to the assignee of the present invention and filed on even data herewith.

FIELD OF THE INVENTION

The present invention relates generally to photographic densitometry and more specifically to a method and apparatus for measuring selected characteristics of a negative to be printed in an enlarged, cropped format so as to determine an optimal exposure for that negative. The invention further relates to the implementation of such a method and apparatus in photographic printers.

BACKGROUND OF THE INVENTION

Many techniques are currently available for determining an exposure for a photographic negative to be printed. These techniques, two of which are shown in FIGS. 1 and 2 described below, typically involve the measuring of selected densitometric characteristics of the individual negative.

Referring now to the series of FIGS. 1A, 1B, 1C, an exemplary photographic negative 10 is shown including a subject 12. In FIG. 1A, a region 14, shown in dashed-line, is identified as the region of negative 10 which is to be enlarged and printed. Many methods are available for identifying region 14, including that of simple visual examination and marking. Many other techniques, both simple and complex, will be readily known to those possessing ordinary skill in the art.

FIG. 1B illustrates in dashed line a region 16 enccompassing substantially the entirety of negative 10. In accordance with one prior art method, the entirety of region 16 is considered in measuring density characteristics of negative 10 to derive an exposure therefor. These density characteristics may include, for example, the large area transmissive density (LATD) of region 16, or the scanned transmissive density of a plurality of picture elements (pixels), i.e. small, discrete areas, distributed throughout the region.

As will be apparent from a consideration of FIGS. 1B and 1C, the latter showing the region 14 to be printed, the above-described method does not yield density characteristics which permit an optimal exposure calculation for that region. The above described method suffers from the inherent disadvantage that, while only a selected region 14 of negative 10 is printed, the exposure calculations for that region are based on densitometric measurements taken across the entirety of negative 10.

FIGS. 2A, 2B, and 2C, in which like elements to those of FIG. 1 are indicated by like reference numerals, are a like series of figures illustrating another known method of making densitometric measurements to calculate printing exposures. In the method shown in FIG. 2, densitometric characteristics of negative 10 are measured only over a selected, limited, region 18 (FIG. 2B) thereof. Region 18 is fixed in size relative to the size of negative 10, and is positioned by an operator (not shown) to overlay a region containing flesh tones and likely to comprise the main subject of the negative. Region 18 thus varies from negative to negative, being positioned by the operator to identify the main subject.

As will be apparent from a consideration of FIGS. 2A-2C, this last described method suffers from the inherent disadvantage of basing the exposure of the enlarged, cropped, printed region 14 of negative 10 on the small, flesh tone region 18. If the main subject does not include flesh tones, or if the background is not substantially neutral, the subsequently calculated exposure will not be optimal.

U.S. Pat. No. 3,708,676 to Huboi et al. (assigned to the assignee of the present invention) shows yet another method of measuring density characteristics for calculating the exposure of a photographic negative. In the Huboi et al. patent, discrete density measurements are taken at a plurality of pixels toward the centrl region of a negative, and a large, average density is taken about the periphery of the negative. Exposure of the negative is then calculated as a function of these density measurements. The method shown in Huboi et al., however, is not varied in accordance with different regions of the negative to be cropped, and thus will not provide optimal exposure control for cropped, printed negatives.

SUMMARY OF THE INVENTION

It is therefor a principal object of the present invention to provide a method and apparatus for determining optimal exposures for photographic negatives which are randomly enlarged, cropped, and printed to provide pleasing prints.

It is a further object of the present invention to provide a photographic printer which determines optimal printing exposures for randomly enlarged and cropped photographic negatives.

In accordance with the present invention, a method of determining the exposure of a photographic negative to be printed in an enlarged, cropped format comprises the step of defining a region of the negative to be printed. Selected characteristics of the negative, preferably density characteristics, are then measured substantially only in the defined region. The exposure is then determined for the defined region using these selected characteristics.

The invention has particular application in a photographic printer providing the described enlarging and cropping capabilities. When the invention is implemented in such a printer, a subsequent print of the negative is made in accordance with the determined exposure.

BRIEF DESCRIPTION OF THE DRAWINGS

While the specification concludes with claims defining the features of the invention that are regarded as novel, it is believed that the invention, together with further objects thereof, will be better understood from a consideration of the following drawing figures, in which:

DETAILED DESCRIPTION OF THE INVENTION

Figure 1:
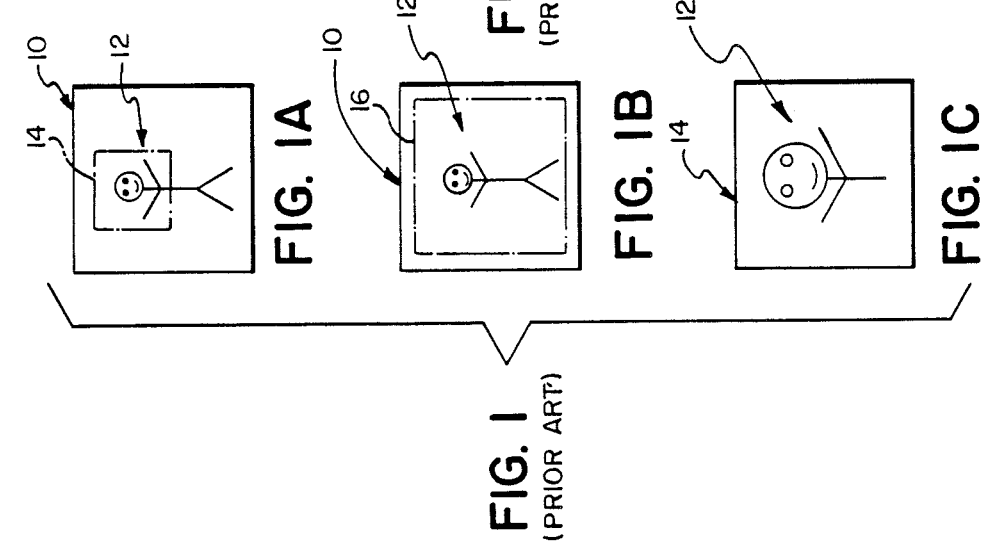
FIG. 1 is a series of three views illustrating the cropping, measuring, and printing of a negative according to one prior art method discussed above.
Figure 2:
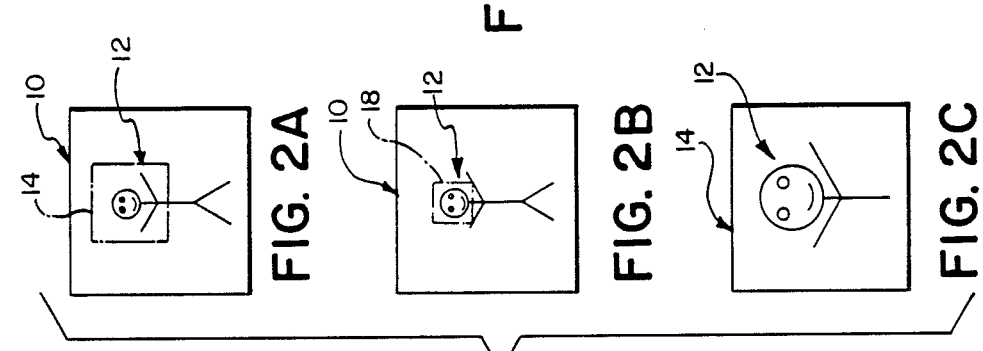
FIG. 2 is a series of views similar to those of FIG. 1, illustrating a different prior art method, also discussed above.
Figure 3:
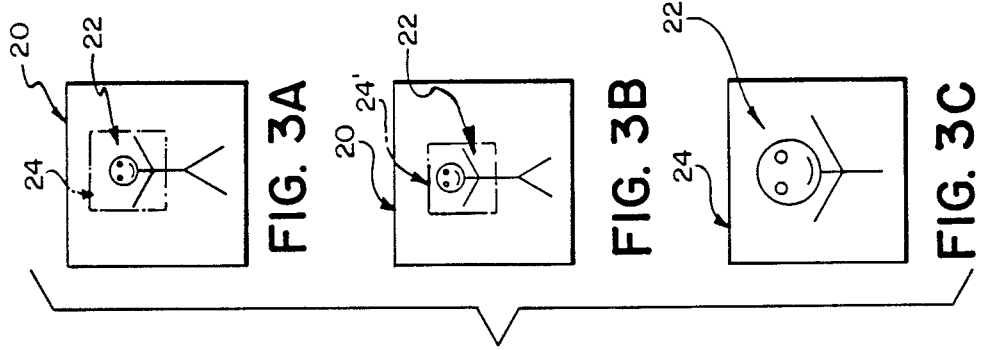
FIG. 3 is a series of views similar to those of FIGS. 1 and 2, illustrating a method in accordance with the present invention.

Referring now to FIG. 3, a photographic negative 20 is shown including a subject 22. Negative 20 comprises a black and white or color negative in a selected photographic format (i.e. 135, or 110, etc...). As shown in FIG. 3A, a region 24, indicated in dashed-line, is defined for enlargement and printing on a photographic printer/enlarger (shown and described below). Region 24 can vary from negative to negative, and is selected to provide a pleasing print composition (as shown in FIG. 3C).

In accordance with the present invention, the region 24' (FIG. 3B) over which densitometric measurements are made corresponds substantially identically to the region 24 to be printed. As discussed above, one of many different techniques can be used to determine densitometric characteristics of region 24' and responsively control the exposure thereof. However, the substantially identical correspondence between the region 24 to be printed and the region 24' to be measured insures that the subsequently calculated exposure will be optimum for the cropped print.

Figure 4:
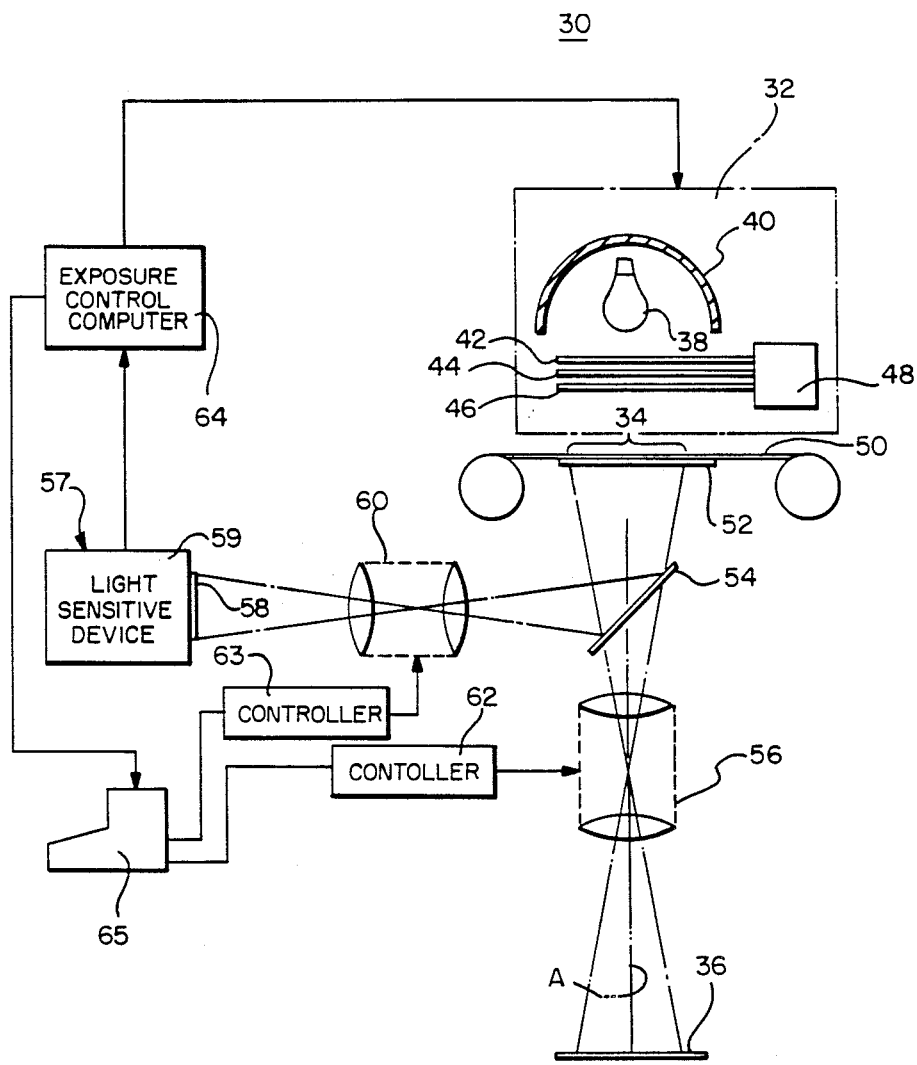
FIG. 4 is a schematic view of a photographic printer constructed in accordance with the present invention.

Referring now to FIG. 4, a photographic printer 30 includes a lamphouse 32 for projecting light through a negative 34 to expose the negative onto photographic papaer 36. Lamphouse 32 comprises a conventional additive or subtractive lamphouse, including a light source 38, a reflector 40, three additive or subtractive filters 42, 44, 46 and a filter controller 48.

Negative 34 comprises, for example, one of a roll 50 or disc (not shown) of photographic negatives, and is supported in a holder 52. Holder 52 preferably comprises a rotatable, X-Y translatable table, for example of the type shown and described in U.S. Pat. No. 4,485,406 to Brownstein et al., incorporated herein by reference in its entirety. (Brownstein et al. is assigned to the assignee of the present invention). Situated between negative 34 and photographic paper 36 are, respectively, a beamsplitter 54 and a zoom lens 56. Lamp 40, negative 34, beamsplitter 54, zoom lens 56, and photographic paper 36 are disposed generally on an optical printing axis A.

Spaced from axis A and disposed substantially perpendicular thereto is a light sensitive device 57 for measuring selected color and density characteristics of negative 34. Device 57 comprises, for example, an array 58 of photosensitive elements (not shown individually), such as photocells or charge coupled devices (CCDs). Further provided with device 57 is appropriate electronic circuitry 59 for converting the output of photosensitive element array 58 to an electronic signal of preselected magnitude and format.

In a preferred embodiment of the invention, device 57 comprises a color video camera employing a solid-state imaging device, for example a Sony model XC-117. In this embodiment, device 57 further includes electronic circuitry, well known to those skilled in the art, for converting the output of the camera to log (Red, Green, Blue) density signals. Device 57 functions to measure the density of discrete picture elements (pixels) within negative 14, and may, as required, average adjoining pixels to reduce data.

It will be appreciated that many apparatus are known to those skilled in the art for performing the function of device 57, and the invention is not limited to those embodiments taught hereinabove.

Figure 5:
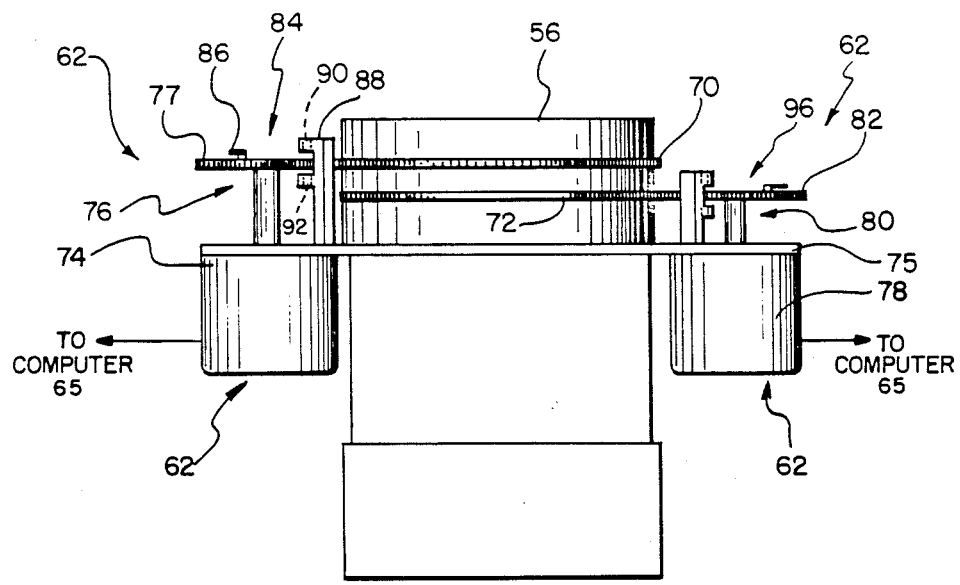
FIG. 5 is a schematic, plan view showing details of the stepper-motor controlled zoom lenses of FIG. 4.

Disposed intermediate beamsplitter 54 and light sensitive device 57, and substantially perpendicular to axis A, is a second zoom lens 60. Appropriate zoom control means 62, 63 are provided for individually controlling the magnification and aperture settings of zoom lenses 56, 60, respectively. Zoom control means 62, 63 comprise, for example, individual servo-motors as shown in the above referenced Brownstein patent, or steppermotors as shown in FIG. 5 below. A user interface, such as a computer 65, is connected to zoom control means 62, 63 for permitting operator and/or computer-controlled, individual adjustment of the magnifications and aperture settings of zoom lenses 56, 60 via the respective control means.

Connected between electronic circuitry 59 in light sensitive device 57, and lamphouse 32, is an exposure control computer 64. In a manner well known to those skilled in the art, exposure control computer 64 reads the densitometric measurements of negative 34 made by device 57, calculates an appropriate exposure for the negative, and controls filters 42, 44, 46 of lamphouse 32 to provide the calculated exposure of negative 34 onto paper 36. Such an exposure can be calculated, for example, in terms of light duration, light intensity, or some combination of intensity and duration for individual colors. Exposure control computer 64 is also connected to computer 65 for providing aperture control information for zoom lenses 56, 60, in a manner described in further detail below.

Figure 6:
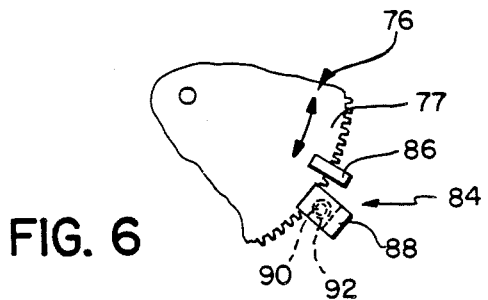
FIG. 6 is a top view of the position sensing mechanism of FIG. 5.

Referring now to FIGS. 5 and 6, a preferred embodiment of zoom lens 56 and associated controller 62 is shown in greater detail.

As shown in FIG. 5, zoom lens 56 comprises a commercially available enlarging zoom lens including exposed, toothed, zoom magnification and aperture control rings 70, 72, respectively. A first, direct current (d.c.), permanent magnet, stepper motor 74 is mounted on zoom lens 56 via an appropriate bracket 75, and attached to zoom magnification control ring 70 via an appropriate drive mechanism 76, the drive mechanism including a gear 77 engaging the control ring. A second such stepper motor 78 is mounted on bracket 75 and attached to aperture control ring 72 via a similar drive mechanism 80 including a gear 82. Alternatively to the use of gears 77, 82, drive belts can be used to couple the motors to the lenses.

Referring now to both FIGS. 5 and 6, supported on the base of stepper motor 74 is a position sensing mechanism indicated generally at 84. Position sensing mechanism 84 includes a tab or flag 86 fixed onto and hence movable with gear 77. Position sensing mechanism 84 further includes an F-shaped bracket 88, bracket 88 being mounted on bracket 75 and hence fixed in a stationary position relative to flag 86. Bracket 88 supports a light emitter and a light sensor, 90, 92, respectively. Light emitter 90 and light sensor 92 are disposed in opposing relationship across the short arms of the "F". An identical position sensing mechanism, indicated at 96, is situated on stepper motor 78. Connections are provided between computer 75 (FIG. 4) and both stepper motor 74, 78 and position sensing mechanisms 84, 96 for communicating logic and control signals therebetween.

In the operation of zoom lens 56 (for purposes of explanation described herein with respect to stepper motor 74 and position sensing mechanism 84), flag 86 is set at a known location on gear 77 relative to a particular magnification setting (i.e. a calibration magnification) for the lens. Bracket 88, light emitter 90, sensor 92 and flag 86 are relatively positioned such that, in the course of rotation of gear 77 by stepper motor 74, the flag will interrupt the light path between the light emitter and sensor when that particular magnification setting is obtained. When the light path between light emitter 90 and sensor 92 is broken, computer 65 is thus calibrated to that known, particular magnification. Computer 65 is then operated to precisely control the motion of stepper motor 74, and thereby alter the magnification of zoom lens 56 to other selectable, known magnifications. Stepper motor 78 and position sensor 96 are used in the identical manner to control the aperture setting of zoom lens 56. While zoom lens 60 can comprise a different lens of different size and optical construction, it functions substantially identically to zoom lens 56, with controller 63 comprising substantially identical stepper-motors.

In operating printer 30 (FIG. 4), upon start-up the magnification and aperture settings of zoom lenses 56, 60 are calibrated to known calibration setttings using computer 65 and controllers 62, 63 (including the position sensing mechanisms 84, 96 etc...) in the manner described above. Negative 34 is loaded into holder 52, and a preselected region thereof (i.e. region 24 of FIG. 3) is defined for printing. This definition of a preselected region of negative 34, commonly referred to as cropping, is performed by projecting negative 34 onto a reflective screen (not shown) indicating the size of, and positioned in the plane of, photosensitive paper 36. This projection of negative 34 is cropped by altering the position of negative 34 with holder 52 while simultaneously altering the magnification of zoom lens 56. The magnification of zoom lens 56 is controlled by a human operator through computer 65 and controller 62 in the manner described above. This cropping process is performed until the region of negative 34 desired to be printed is shown in the correct size and position on the reflective screen.

After defining the preselected region of negative 34 which is to be printed, the magnification of zoom lens 60 is adjusted such that substantially the identical region is imaged onto light sensitive array 58. This is accomplished by using computer 65 and zoom control means 63 to set the magnification of zoom lens 60 as a predetermined function of the magnification selected for zoom lens 56. Because, as described above, the magnifications of zoom lenses 56, 60 are calibrated with computer 65 at start-up, subsequent control of the lenses is accomplished by stepping the various stepper motors in a controlled manner. The relative magnification settings of zoom lenses 56, 60 required to obtain the described result will, of course, vary dependant on the size of the print on paper 36, the size of light sensitive array 58, and the distances between the various elements of printer 30. Such relative magnification settings are readily determinable by those possessing ordinary skill in the art.

The aperture of zoom lens 60 is varied through controller 63 as appropriate to compensate for apparent changes in the f-stop of the zoom lens as its magnification is varied. This compensation can be provided by computer 65, or exposure control computer 64. The aperture of zoom lens 56 is likewise controlled through controller 62 to accommodate the apparent f-stop changes with varying magnification. The aperture of zoom lens 56 can also be varied by exposure control computer 64, through computer 65 and controller 62, to control the exposure of negative 34 onto paper 36.

In this manner, light sensing array 58 is exposed to substantially the same portion of negative 34 that is to be cropped and printed on photographic paper 36. Thus, the exposure of negative 34, determined by exposure control computer 64, is based on densitometric measurements, preferably of pixels, of only that region of the negative to be printed. The calculated exposure will therefor be optimum for any cropping selected by the operator. While these calculations are being made, a shutter (not shown) is interposed on optical path 36 to block light, and photographic paper 36 is positioned for exposure. The actual exposure of negative 34 onto photographic paper 36 is obtained through the control of lamphouse 32 by computer 65.

There is thus provided a method and apparatus for determining the exposure of a photographic negative to be printed in a cropped format. The exposure is based on density characteristics of only that region of the negative selected for printing, and thus will provide an optimum exposure regardless of the particular cropping selected. The invention has particular application in an enlarging, cropping photographic printer, such as that shown in U.S. Pat. No. 4,616,926, assigned to the assignee of the present invention, and incorporated herein by reference. The invention provides a human operator substantially unlimited artistic freedom to crop photographic negatives to print any selected feature, while optimizing the exposure for each individual print. The invention provides a substantial improvement over the prior art methods of determining exposure described hereinabove.

It will be appreciated that the present invention is not limited to the above described method of adjusting lens 56 to define the region of negative 34 to be printed. The Brownstein et al. reference cited above, for example, describes a relatively sophisticated method for performing cropping of a negative on a video display. According to this method, a video monitor (not shown) is connected to light sensing device 57, and the magnification of zoom lens 60 is adjusted to define the region of negative 34 to be printed. The magnification of zoom lens 56 is then adjusted, as a function of the magnification of zoom lens 60, to expose the selected region of negative 34 onto paper 36. In accordance with the present invention, the region of negative 34 on which the exposure calculations of computer 64 are based still correspond substantially identically to the region printed.

While a preferred embodiment of the invention has been illustrated and described, it will be clear that the invention is not so limited. More specifically, it will be appreciated that the invention is not limited to the particular optical system, including the beamsplitter and zoom lenses, shown and describe. Numerous modifications, changes, variations, substitutions and equivalents will occur to those skilled in the art without departing from the spirit and scope of the invention.

What is claimed is:

1. A method of determining the exposure of a photographic negative to be printed in a cropped format comprising the steps of:
   defining a freely chosen, limited region of the negative to be printed;
   measuring selected characteristics of the negative in an area substantially only in said region, which area is defined in response to defining said region; and
   determining, using said selected characteristics, an exposure for said region.

2. The method of claim 1 wherein said measuring step comprises measuring selected density characteristics of said region.

3. The method of claim 2 wherein said step of measuring selected density characteristics comprises measuring the transmissive density of selected pixels in said region.

4. Apparatus for determining the exposure of a photographic negative to be printed in a cropped format comprising:
   means for defining a freely chosen, limited region of the negative to be printed;
   means for measuring selected characteristics of the negative in an area substantially only in said region, which area is defined in response to defining said region; and
   means for determing, using said selected characteristics, an exposure for said region.

5. Apparatus in accordance with claim 4 wherein said measuring means comprises means for measuring selected density characteristics of said region.

6. Apparatus in accordance with claim 5 wherein said density characteristics measuring means comprises means for measuring the transmissive density of selected pixels in said region.

7. Apparatus in accordance with claim 4 wherein said exposure determining means comprises an exposure control computer responsive to said selected characteristics.

8. A photographic printer for printing a photographic negative in a cropped format on a photographic paper, comprising:
   means for defining a freely chosen, limited region of said negative to be printed onto said photographic paper;
   means for measuring selected density characteristics of said negative in an area substantially only in said region, which area is defined in response to defining said region;
   means for using said selected density characteristics to calculate an exposure for said negative region; and
   means for exposing said negative region onto said photographic paper in accordance with said exposure.

9. A photographic printer in accordance with claim 8 wherein said selected density characteristics measuring means comprises:
   an array of light sensitive devices spaced from said negative; and
   means for imaging said negative onto said array such that said negative region substantially fills said array.

10. A photographic printer in accordance with claim 9 wherein said imaging means includes a zoom lens disposed between said negative and said light sensitive array.

11. A photographic printer in accordance with claim 8 wherein said means for exposing said negative region onto said photographic paper comprises a zoom lens disposed between said negative and said photographic paper.

12. A photographic printer in accordance with claim 8 wherein said means for exposing said negative region onto said photographic paper comprises an exposure control computer responsive to said selected density characteristics for calculating an exposure for said negative region.

13. A photographic printer in accordance with claim 12 wherien said means for exposing said negative region onto said photographic paper further includes a lamphouse having controllable filters responsive to said exposure control computer.

* * * * *